US005299347A

United States Patent [19]

Decker

[11] Patent Number: 5,299,347

[45] Date of Patent: Apr. 5, 1994

[54] TOOL FOR REMOVING AND INSERTING A PLUMBING FIXTURE SEAL STRUCTURE

[76] Inventor: Joseph Decker, 9093 Lockwood Hill, Cincinnati, Ohio 45247

[21] Appl. No.: 22,680

[22] Filed: Mar. 1, 1993

Related U.S. Application Data

[63] Continuation-in-part of Ser. No. 880,523, May 8, 1992, abandoned.

[51] Int. Cl.[5] .................... B23P 11/02

[52] U.S. Cl. .................... 29/235

[58] Field of Search .................... 29/263, 255, 280, 270, 29/278, 235, 268

[56] References Cited

U.S. PATENT DOCUMENTS 149,983 4/1874 Bragaw .
1,458,076 6/1923 Potts .
1,518,222 12/1924 Sather .
1,544,235 6/1925 Johnson et al. .
2,331,920 10/1943 McMaster .
2,550,564 4/1951 Hutton .
2,870,629 1/1959 Willis .
3,393,439 7/1968 Shriver .
3,641,659 2/1972 Colgan et al. .
4,724,608 2/1988 Parrott .................... 29/263
4,944,081 7/1990 Ross .

OTHER PUBLICATIONS

Johnstone Supply Wholesale Catalog, Spring 1992 (cover and p. 765).

*Primary Examiner*—Robert C. Watson
*Attorney, Agent, or Firm*—Frost & Jacobs

[57] ABSTRACT

A novel tool for both removing and inserting a plumbing fixture seal structure. The tool comprises an outer housing, an inner member having a tapered end, this inner member being reciprocably disposed at least partially within outer housing, and a means for retracting the tapered end of the inner member at least partially into the outer housing. The tool may also have a means for providing fluid communication between a hole in the seal structure and the ambient.

20 Claims, 4 Drawing Sheets

TOOL FOR REMOVING AND INSERTING A PLUMBING FIXTURE SEAL STRUCTURE

This application is a continuation-in-part application of Ser. No. 07/880,523, filed May 8, 1992 now abandoned.

A. BACKGROUND OF THE INVENTION

1. Field of the Invention

This invention relates to a novel tool for both removing and inserting a plumbing fixture seal structure. More particularly, the present invention permits one to quickly and easily remove and insert these seal structures in remote areas, even if fluid is still present or flowing through the plumbing fixture.

2. Description of Related Art

All plumbing fixtures utilized for the delivery of a fluid must have some type of seal structure whereby the fluid will only flow through the fixture when desired. Should this seal structure fail, the fluid may flow through the fixture when the valve mechanism is in the off position, or even leak from the plumbing fixture itself. In the case of household fixtures, such as a kitchen or bathtub faucet assembly, the failure of the seal structure is often characterized by water dripping from the faucet. This, of course, necessitates a repair of the seal structure in the fixture.

Two particular types of plumbing fixture in common use in both household and commercial settings are those manufactured by the Delta Faucet Company and the Peerless Faucet Company. A characteristic of these types of fixtures is that the seal structure comprises a hollow, cylindrical rubber cup and a cylindrical, tapered, compression spring, both of which must be inserted into the proper opening in the fixture. Eventually, these components wear out, and the fixtures will begin to leak. The rubber cups may become brittle and cracked, or fail in some other way. Additionally, the springs may lose their memory and fail to perform as intended. Replacement of these two elements will often stop any leakage that occurs through the fixtures, and is normally rather inexpensive. Certainly this replacement is much less expensive than replacing the entire plumbing fixture.

The replacement of these elements essentially only requires the removal of the old components and insertion of new ones. While this may seem simple enough, the shape of the cups and springs, as well as the configuration of the plumbing fixture itself will often make this task rather difficult.

In the case of the rubber cups and springs utilized in Delta and Peerless brand fixtures, both elements must be placed in the appropriate opening together. As its name implies, the rubber cup must also be seated inside this opening so that a firm seal is formed between the outer edges of the rubber cup and the circumference of the opening. Further complicating this process is the fact that the compression spring is inserted into the opening before the rubber cup, thereby providing a force opposing any effort to seat the rubber cup.

Another problem with these repairs is that the configuration of the plumbing fixture itself may make the removal and insertion of the components rather difficult. Often they are placed in a remote location within the fixture itself. For example, the openings into which the components are inserted may be contained deep within a confined area of the plumbing fixture. The placement of the plumbing fixture itself may further complicate the situation, as the portion of the fixture containing the cups and springs may be placed deep within a wall, a cabinet, or some other cramped location.

Even further complicating this process, is the fact that often there will be fluid present in the fixture itself, or even flowing through it. While one would normally shut off the fluid supply to the fixture when performing a repair, this does not necessarily mean that there will be no fluid present when the components are being replaced. Fluid will often remain in the fixture, even though the supply valves have been shut off. The presence of this fluid is especially problematic when one attempts to insert a new cup and spring into the proper opening in the fixture, since the rubber cup must be seated in the opening.

The most difficult situation in which to replace the cups and springs in a plumbing fixture is when fluid is still partially flowing through the fixture itself. In this case, seating the rubber cups may be impossible due to the force of the flowing fluid. While one should never attempt a repair when a fixture is under full pressure (since serious burns from hot fluid may result), often even small amounts of flowing fluid will make seating the rubber cups impossible. This situation can occur due to a number of reasons.

One situation in which fluid may continue to flow through the plumbing fixture is when the supply valves do not function properly. In this situation, fluid may continue to flow, at least partially, through the supply valves and, therefore, through the fixture itself. Due to the problems associated with the prior art methods of replacing the cups and springs, it has usually been more desirable to just allow a plumbing fixture to continue to leak if the fluid supply valves cannot be completely shut off.

Fluid may also continue to flow through the plumbing fixture when a portion of piping between the supply valve and the fixture is located at a higher elevation than the fixture itself. When this is the case, fluid will continue to flow due to gravity through the fixture until that portion of the piping between the supply valve and the fixture which is at a higher elevation than the fixture has completely drained. Depending upon the configuration of the piping, drainage can take a considerable amount of time. If, for example, the fixture is being utilized in a hospital, the delay involved may be completely unacceptable, especially if the supply valve services several fixtures.

Methods that have previously been used for replacing the rubber cups and springs in plumbing fixtures have been rather primitive. One can, often with great difficulty, attempt to both remove and insert the structures by hand without any tools at all. Usually, however, it will be impossible to grasp the tiny cups and springs or to even have enough room to place one's hands in the confined area of the fixture.

Most of the time tools designed for other purposes are used in the repair process, and plumbers themselves generally even resort to these methods. In order to remove the rubber cups and springs, one can insert the tip of a screwdriver or similarly shaped object into the hollow center of the two components and then flick the cup and spring out of the fixture. Of course one has little or no control over the outcome of such a method, and the rubber cup and spring may be lost. They could even end up going down a drain, especially if fluid is still flowing through the fixture.

Inserting a new cup and spring in a plumbing fixture using these primitive methods is even more difficult. One manufacturer recommends placing the components on the end of a pencil, and inserting the end of the pencil into the appropriate opening in the fixture. One can then use either their finger or some type of tool (such as a screwdriver) to force the cup and spring off of the pencil while at the same time holding it in the appropriate opening in the fixture. Obviously, this is a delicate procedure which may take several tries and two hands in a small fixture to be successful. Additionally, the use of a tool such as a screwdriver can easily damage the rubber cups.

Further complicating this procedure is the fact that components such as the rubber cup and spring of Delta and Peerless type fixtures must be properly seated in the appropriate orifice. Once again one's finger or some other tool designed for an entirely different purpose must be used to press the rubber cup into place. Such a process is extremely difficult if the openings into which the structures must be inserted are located in a confined space.

Should fluid be present in, or partially flowing through the plumbing fixture, seating the cups may be impossible by these methods. If fluid is present or flowing through the fixture, it will also be present in or flowing through the orifices into which the cups and springs must be firmly inserted, thereby creating a force opposing the seating of the cup. Furthermore, if a liquid is flowing through the opening into which the structures are to be inserted, attempting to seat a rubber cup will cause the liquid to uncontrollably spray from the area around the cup. Therefore, oftentimes the only solution heretofore has been to either wait until fluid is not flowing through the fixture, or to forego repair of the problem until the fluid flow can be completely shut off.

Consequently, heretofore there has not been available tool for quickly and easily removing and inserting these aforementioned plumbing fixture seal structures, particularly when fluid is present in or flowing through the fixture.

B. SUMMARY OF THE INVENTION

While not exclusive, the following describes some of the important features and objectives of the present invention.

It is an object of the present invention to provide a tool for quickly and easily removing and inserting a plumbing fixture seal structure.

It is a further object of the present invention to provide a tool for quickly and easily removing a plumbing fixture seal structure, wherein fluid is present in or flowing through the fixture itself.

It is a further object of the present invention to provide a tool for quickly and easily removing and inserting a plumbing fixture seal structure, wherein the opening in the fixture where the sealing means is normally placed is located in a remote area.

It is yet another object of the present invention to provide a tool for quickly and easily removing and inserting a plumbing fixture seal structure, wherein the tool also seats the seal structure firmly in the appropriate opening in the fixture without the use of other tools or devices.

The foregoing objects can be accomplished in accordance with one aspect of the present invention, by providing an outer housing having a first end of outer width greater than the inner diameter of the plumbing fixture seal structure, an inner member reciprocably disposed at least partially within the outer housing, wherein the inner member has a tapered end which may extend beyond the aforementioned first end of the outer housing, and a means for retracting at least part of the tapered end of the inner member into the outer housing. In the preferred embodiment of the invention, the means for retracting the tapered end of the inner member comprises grips attached to the inner member and protruding from the sides of the outer housing, and the tool further comprises a vent channel and orifice which provide fluid communication between the plumbing fixture and the ambient.

BRIEF DESCRIPTION OF THE DRAWINGS

While the specification concludes with the claims particularly pointing out and distinctly claiming the present invention, it is believed the same will be better understood from the following description taken in conjunction with the accompanying drawings in which:

DETAILED DESCRIPTION OF THE INVENTION

Figure 1:
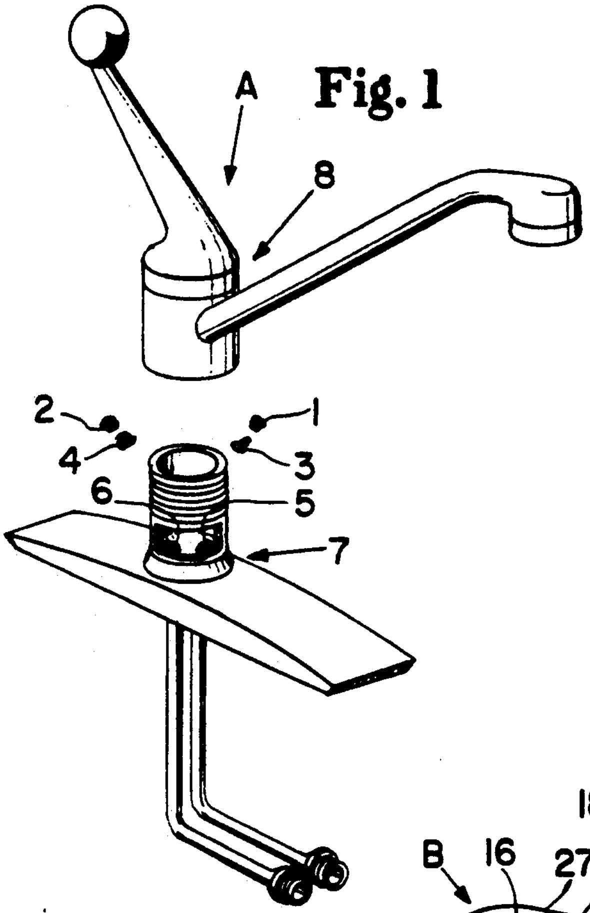
FIG. 1 is an exploded view of a plumbing fixture illustrating two sets of rubber cups and springs, and further illustrating the location in the fixture where these cups and springs are inserted.

Referring now the drawings in detail, wherein like numerals indicate the same elements throughout the views, FIG. 1 is an illustration of one type of plumbing fixture A in which the tool according to the present invention can be utilized. Specific structural details of plumbing fixture A are omitted, however the most pertinent aspects are shown. The particular type of seal structures employed in fixture A are two identical sets of hollow rubber cups, 1 and 2, and tapered compression springs, 3 and 4. Other types of seal structures may be employed in plumbing fixtures, and it is not intended that the tool of the present invention be limited to the particular seal structure shown in FIG. 1 and throughout the other drawings. In fact, it is contemplated that the tool according to the present invention may even be used for similar purposes unrelated to plumbing fixtures.

In order for plumbing fixture A shown in FIG. 1 to be operational and not leak, rubber cups 1 and 2, as well as springs 3 and 4 must be firmly seated in the appropriate circular openings 5 and 6, respectively, contained deep within the base unit 7. Springs 3 and 4 are inserted into openings 5 and 6 ahead of rubber cups 1 and 2, and provide an outward force against rubber cups 1 and 2. The outward force provided by springs 3 and 4 assists in forming a tight seal between rubber cups 1 and 2 and the inner valve assembly of the faucet assembly 8.

Rubber cups 1 and 2 must also be firmly seated within their respective openings 5 and 6 in order that faucet assembly 8 can be properly threaded onto base unit 7. In order to accomplish this, pressure must be applied to the rubber cups in opposition to the force provided by compression springs 3 and 4. Since cups 1 and 2 are made of a resilient material, they will deform slightly when pressed into openings 5 and 6, and thus be properly seated.

As further shown in FIG. 1, openings 5 and 6 are contained within the confines of base unit 7, and thus may be difficult to reach. The particular orientation of fixture A of FIG. 1 may make reaching openings 5 and 6 even more difficult, and since fixture A of FIG. 1 is only exemplary of one particular type of plumbing fixture, other fixture configurations may make the task of removing and inserting cups 1 and 2 even more difficult.

Figure 2:
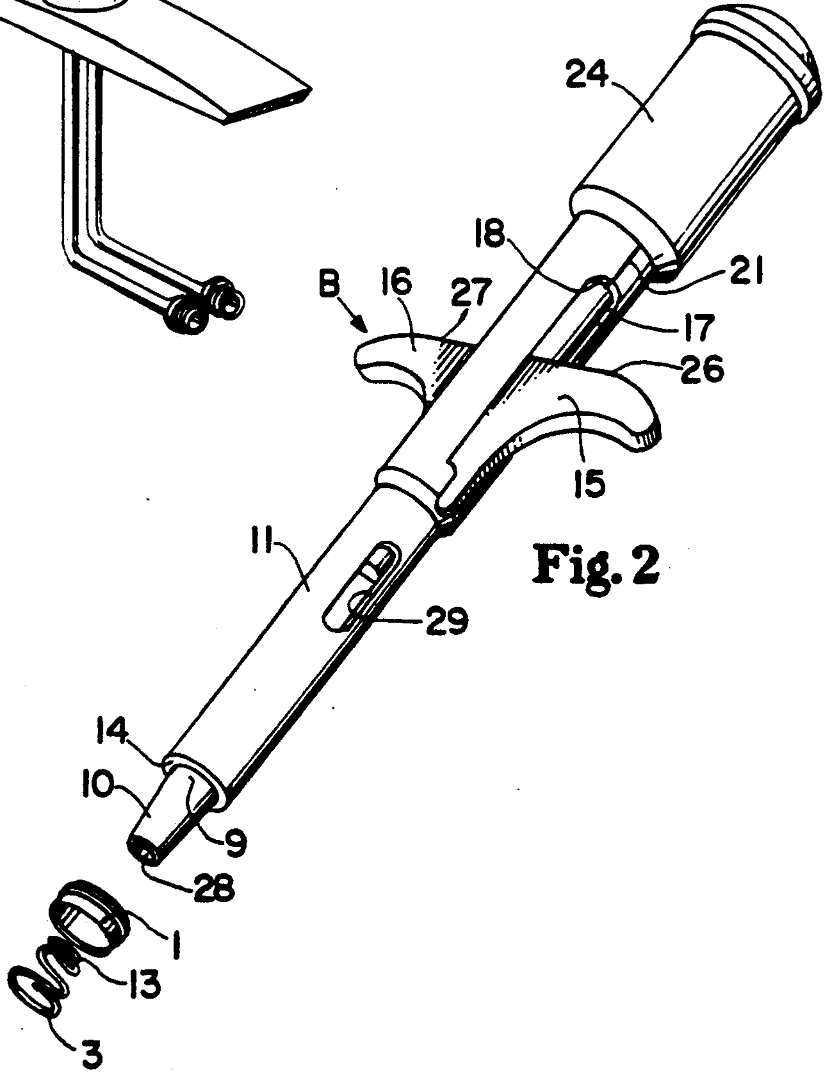
FIG. 2 is an illustration of one embodiment of the apparatus made in accordance with the present invention, and a typical rubber cup and spring to be used therewith.

FIG. 2 shows an assembled preferred embodiment of a tool according to the present invention. Cup 1 and tapered compression spring 3 are also shown to assist in explaining the use of the tool. The embodiment shown in FIG. 2 primarily comprises an inner member 9 reciprocably disposed at least partially within an outer housing 11, and a means for retracting the tapered primary end 10 of inner member 9 at least partially within outer housing 11.

Figure 5:
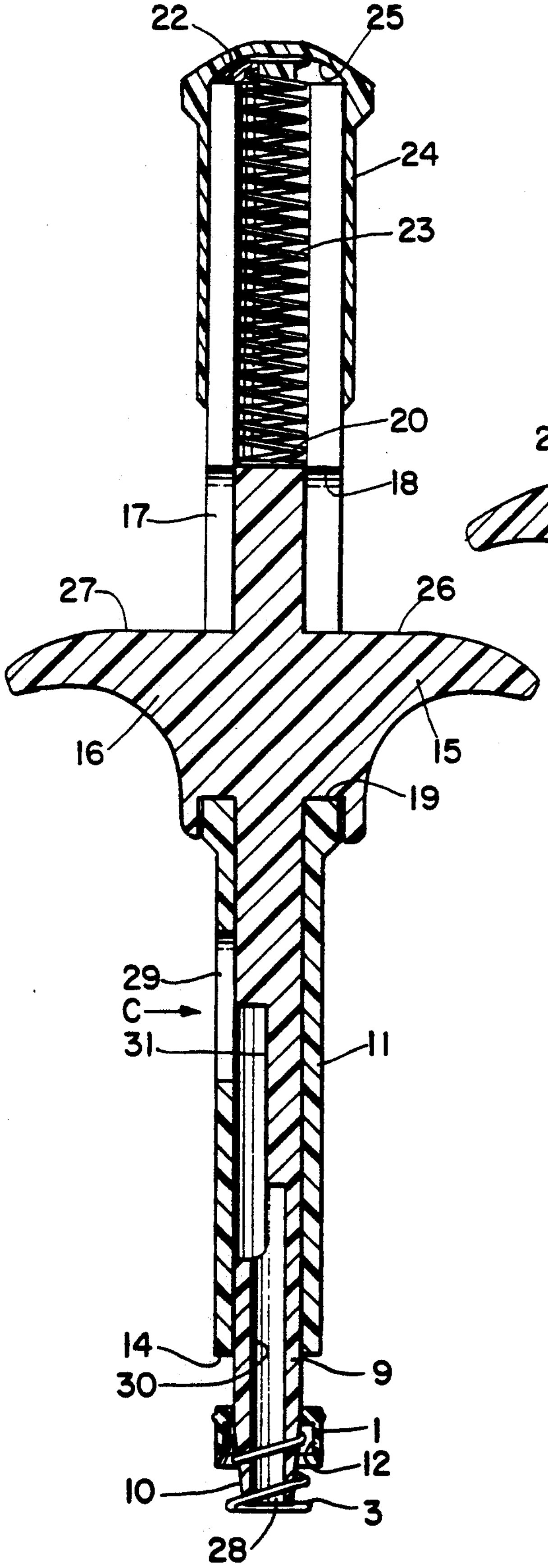
FIG. 5 is a cross-sectional view of the embodiment shown in FIG. 2 of the apparatus made in accordance with the present invention wherein the inner member is in its extended position and a rubber cup and spring are in place on the tapered end of the inner member.

Tapered primary end 10 of inner member 9 tapers from a width greater than the inner diameter of the hole 35 through rubber cup 1, to a width less than the inner diameter of hole 35. Thus, primary end 10 can be firmly inserted into hole 35, thereby gripping rubber cup 1. Additionally, as shown in FIG. 5, since the rubber cup 1 also has a recessed portion 12 having a diameter slightly greater than the inner diameter of hole 35, spring 3, which is normally inserted into cup 1, will be held in place between primary end 10 and recessed portion 12. It will thus be understood that primary end 10 is capable of gripping any hollow seal structure as long as primary end 10 is sized appropriately for the inner diameter of the hole through the seal structure.

The primary purpose of outer housing 11 is to provide a mechanism for forcing the seal structure off of tapered primary end 10 of inner member 9. As long as the first end 14 of outer housing 11 has a greater width than the inner diameter of the hole through the seal structure, the seal structure will be forced off of tapered primary end 10 when primary end 10 is retracted within outer housing 11. Thus, although the embodiment shown in FIG. 2 depicts inner member 9 as being completely contained within outer housing 11 except for primary end 10, it is evident that the outer housing could also encompass only a small portion of inner member 9 and still perform in the same manner.

The means B for retracting at least a portion of tapered primary end 10 of inner member 9 into outer housing 11 in the embodiment of FIG. 2 comprises grips 15 and 16 which are carried by inner member 9 and extend through a longitudinal slot 17 in outer housing 11. Numerous alternative means for retracting primary end 10 could easily be employed, such as a single grip extending from either the side of the tool or the end of the tool opposite tapered primary end 10.

Figure 3:
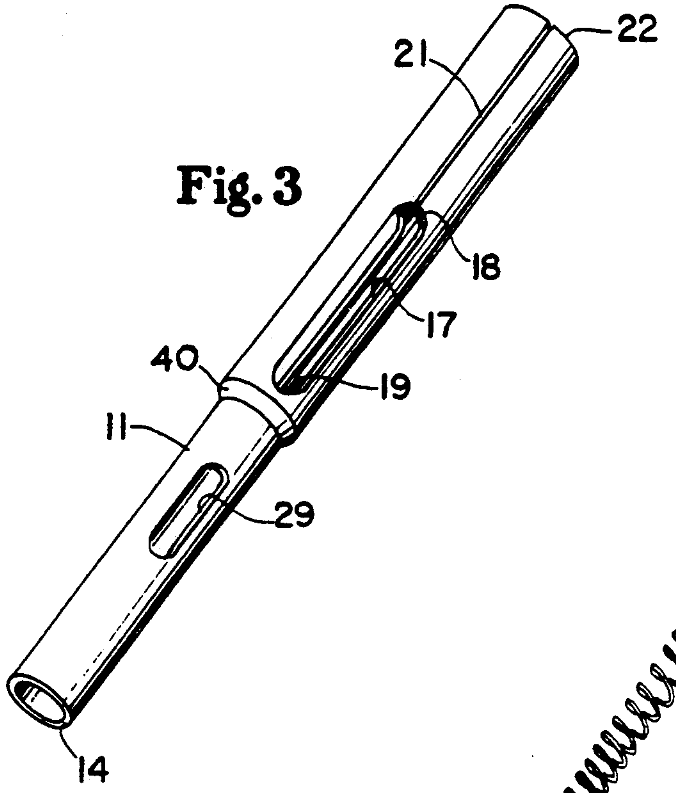
FIG. 3 is an illustration of the outer housing of the embodiment shown in FIG. 2 of the apparatus made in accordance with the present invention.

Further details of the designs of outer housing 11 and inner member 9 of the embodiment in FIG. 2 are shown in FIG.'s 3 and 4, respectively. In FIG. 3, outer housing 11 is substantially cylindrical in shape and hollow throughout its entire length. There is no requirement, however, that outer housing 11 be cylindrical, as long as inner member 9 can be reciprocably disposed within it. Thus, outer housing 11 could be of square or rectangular cross-section. Outer housing 11 is also shown as having a taper 40 along its length. The purpose of taper 40 is to give added strength to the upper portion of outer housing 11, and to provide greater comfort. Obviously, however, taper 40 may be omitted without changing the functioning of the apparatus.

As further shown in FIG. 3, longitudinal slot 17 preferably extends across the entire width of outer housing 11 so that both of grips 15 and 16 carried by inner member 9 may extend through and away from the tool itself. Should only one of such grips be used, longitudinal slot 17 need not extend through the entire width of outer housing 11. Further, longitudinal slot 17 has upper and lower ends 18 and 19, respectively, which limit the movement of grips 15 and 16, and thereby limit the reciprocation of inner member 9. As an alternative, the reciprocation of inner member 9 could be limited by having some sort of stop contained within outer housing 11 which would act directly against the secondary end 20 of inner member 9.

Outer housing 11 is also shown in FIG. 3 as having a lengthwise slit 21 which extends across the entire width of outer housing 11 from upper end 18 of longitudinal slot 17 to second end 22 of outer housing 11. The purpose of slit 21 is to permit the insertion of inner member 9 into outer housing 11. Slit 21 permits second end 22 to be spread apart so that inner member 9 carrying grips 15 and 16 may be inserted into outer housing 11. As second end 22 is spread apart, slit 21 is widened, thereby permitting grips 15 and 16 to slide within slit 21 to their proper position in longitudinal slot 17. Lengthwise slit 21 may be omitted if grips 15 and 16 are attached to inner member 9 after inner member 9 is inserted into outer housing 11, such as by gluing. In addition, should an alternative means for retracting primary end 10 of inner member 9 into outer housing 11 be employed, lengthwise slit 21 may not be needed.

Figures 7, 8, 9:
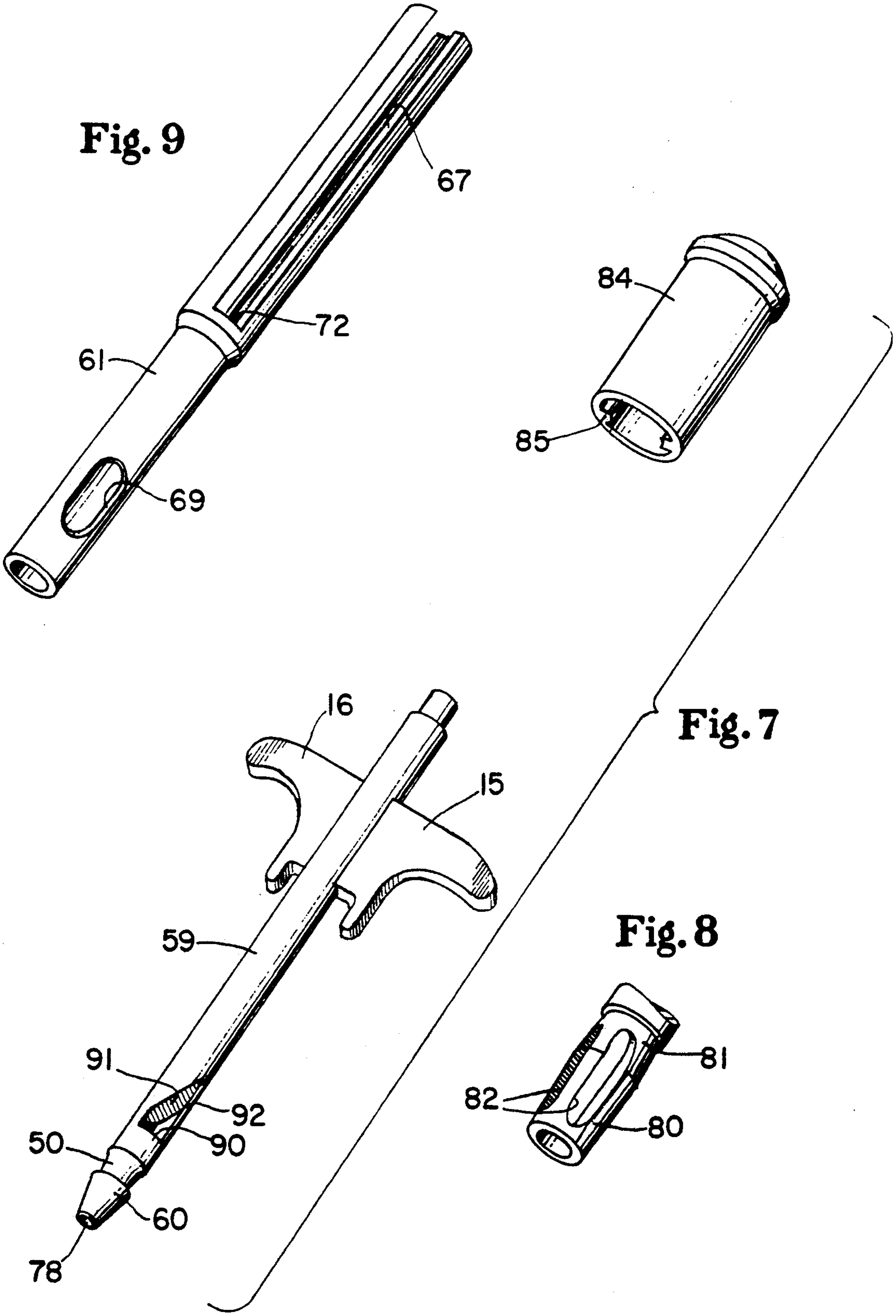
FIG. 7 is an illustration of a preferred embodiment of the inner member and cap assembly made in accordance with the present invention.
FIG. 8 is an illustration of yet another embodiment of the inner member.
FIG. 9 is an illustration of a preferred embodiment for the outer housing of the apparatus made in accordance with the present invention.

A presently preferred embodiment for outer housing 61 is shown in FIG. 9. In this configuration longitudinal slot 67 extends completely to second end 72 of outer housing 61. In this fashion, there is no need to provide a lengthwise slit for inserting the inner member into outer housing 61. The reciprocation of the inner member is once again limited by lower end 72 of longitudinal slot 67. In the embodiment shown in FIG. 9, however, the retraction of the inner member is limited by cap assembly 84 (shown in FIG. 7). When cap assembly 84 is secured to outer housing 61, lower edge 85 of cap assembly 84 will act as a stop for grips 15 and 16. Cap assembly 84 may be attached to outer housing 61 by any of a number of means, however it is preferred that the inner diameter of cap assembly 84 be such that it is held in place without the need for gluing or the like.

Figure 4:
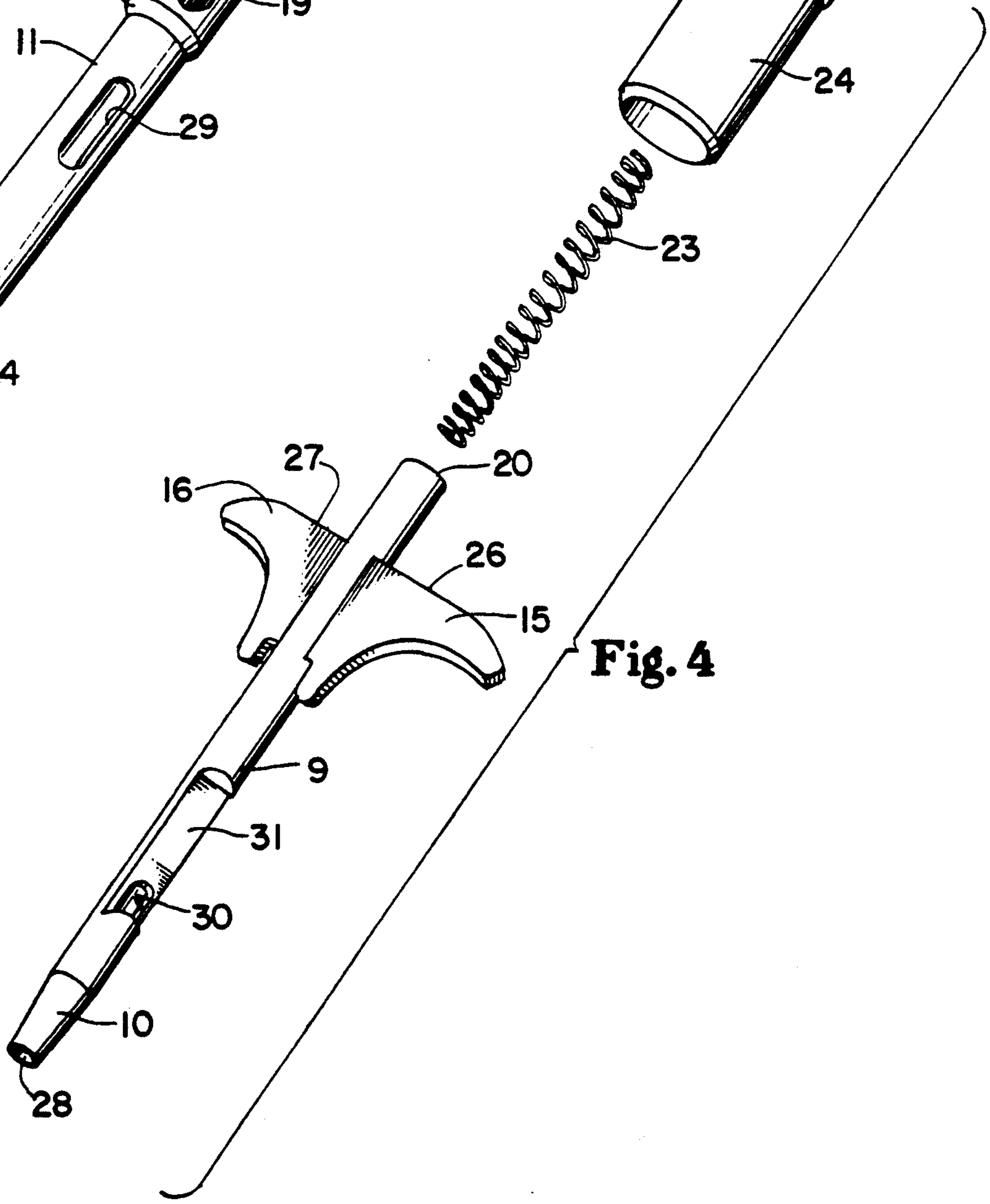
FIG. 4 is an illustration of the inner member, the compression spring, and the cap assembly of the embodiment shown in FIG. 2 of the apparatus made in accordance with the present invention, and further illustrates the orientation of these three elements with respect to one another.

FIG. 4 depicts inner member 9 of the embodiment shown in FIG. 2, and is shown as being substantially cylindrical in shape. Of course other cross-sectional shapes of inner member 9 may be employed, depending on the shape of outer housing 11. Grips 15 and 16 in the embodiment of FIG. 4 are trigger shaped structures carried by inner member 9, however it will be understood that a multitude of shapes could be used in place of those shown. For example, grips 15 and 16 could be circular rings attached to inner member 9. The trigger-shape of grips 15 and 16 are preferred, however, as they are easily molded and are comfortable to the user.

It is also preferable, but not required, that inner member 9 be spring biased to a position wherein tapered primary end 10 extends at least partially beyond first end 14 of outer housing 11. To accomplish this, a compression spring 23 and a cap assembly 24 are provided, as shown in FIG. 4. As better depicted in FIG. 5, compression spring 23 is inserted into outer housing 11 after inner member 9 has been inserted, and cap assembly 24 is then firmly affixed to second end 22 of outer housing 11. In this manner, compression spring will be disposed between secondary end 20 of inner member 9 and the internal end 25 of cap assembly 24, thereby spring biasing inner member 9 in the desired direction. As an alternative to the spring biasing method described above, a spring surrounding the circumference of inner member 9 could be provided.

Figure 6:
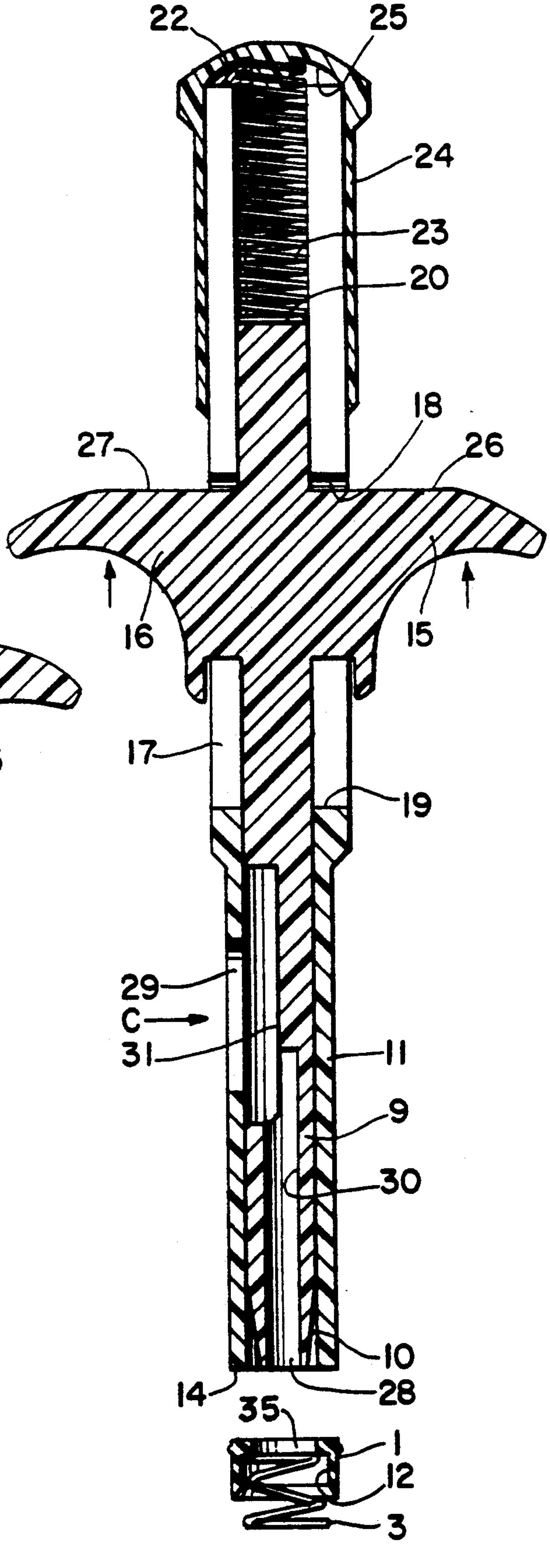
FIG. 6 is a cross-sectional view of the embodiment shown in FIG. 2 of the apparatus made in accordance with the present invention, wherein the inner member is in its retracted position and the rubber cup and spring of FIG. 5 are shown being forced off of the tapered end of the inner member.

FIGS. 5 and 6, which are cross-sectional views of the embodiment of FIG. 1, depict the normal operation of the tool according to the present invention. In order to remove a worn out seal structure from a plumbing fixture, the embodiment of the tool shown in FIG. 5 is grasped in one hand while simultaneously applying force against the top surfaces 26 and 27 of grips 15 and 16, respectively, with the same or other hand. Tapered primary end 10 of inner member 9 is then inserted into hole 35 of rubber cup 1, which will be seated in opening 5 within base unit 7 of the fixture shown in FIG. 1. By continuing to apply pressure against surfaces 26 and 27 while slightly twisting the entire tool, tapered primary end 10 is forced into hole 35, thereby firmly grasping both rubber cup 1 and tapered compression spring 3. The tool can then be removed from base unit 7 with worn out rubber cup 1 and spring 3 attached, as shown in FIG. 5.

In order to insert the new seal structure into the fixture, the above process is reversed. New rubber cup 1 and new spring 3 are firmly placed on tapered primary end 10 of inner member 9, while applying pressure against surface 26 and 27. Cup 1 and spring 3 will then be attached to primary end 10 as shown in FIG. 5. Since inner member 9 is spring biased so that at least a portion of primary end 10 extends beyond first end 14 of outer housing 11, cup 1 and spring 3 will remain attached to primary end 10 as long as desired.

The tool of FIG. 5 is then grasped in one hand, while simultaneously applying force to surfaces 26 and 27. Rubber cup 1 and spring 3 which are still attached to tapered primary end 10 are then inserted into opening 5 within base unit 7 of FIG. 1, while continuing to apply force to surfaces 26 and 27. In this manner, cup 1 will be seated in opening 5 with spring 3 also in its proper position. Force is then applied to cap assembly 24 while simultaneously pulling grips 15 and 16 towards cap assembly 24. Tapered primary end 10 of inner member 9 will thus be removed from hole 35 of cup 1, while first end 14 of outer housing 11 simultaneously applies a uniform force against cup 1, thereby firmly seating rubber cup 1 and spring 3 in their proper position.

FIG. 7 depicts a presently preferred embodiment for the inner member which facilitates removal of rubber cup 1 and spring 3. In this embodiment, a groove 50 is provided on inner member 59 adjacent tapered primary end 60. It is also preferred that the reciprocation of inner member 59 within the outer housing be such that the entire length of groove 50 extends beyond first end 14 of outer housing 11. When tapered primary end 60 of inner member 59 is inserted into hole 35 of rubber cup 1, primary end 60 will cause rubber cup 1 to expand slightly since outward pressure will be asserted on hole 35. This outward pressure can make removal of rubber cup 1 difficult, especially when rubber cup 1 has become dried-out or brittle. When the embodiment shown in FIG. 7 is utilized, as inner member 59 is further inserted into hole 35 of rubber cup 1, groove 50 will enter hole 35 of rubber cup 1 thereby relieving the pressure that was being asserted by tapered primary end 60. In the same fashion, compression spring 3 will also be forced into groove 50. In addition to relieving the pressure on rubber cup 1, the provision of groove 50 also provide the sound and feel of a "click" as groove 50 enters hole 35 of rubber cup 1 and compression spring 3. This gives a positive sign to the user that rubber cup 1 and spring 3 can now be easily removed without fear of them coming disengaged from inner member 59.

Another alternative embodiment for the inner member is shown in FIG. 8. In this embodiment, a plurality of length-wise slits 82 are cut into tapered primary end 80 and extend through groove 81. The purpose of these slits is to impart flexibility to tapered end 80, thereby permitting this embodiment to adequately insert and remove rubber cups having somewhat smaller holes. Additionally, and perhaps more significantly, the plurality of longitudinal slits provided in the embodiment shown in FIG. 8 make insertion of primary end 80 into hole 35 of rubber cup 1 and spring 3 somewhat easier since the slits allow tapered end 80 to compress a small amount. This additional benefit can be important when, for example, the tool of the present invention is being used continuously on an assembly line.

As discussed previously, oftentimes one must remove and/or insert a seal structure into a plumbing fixture while fluid is present of flowing through the fixture. In the plumbing fixture shown in FIG. 1, for example, it may be necessary to replace rubber cup 1 and springs 3 while water is present in or flowing through hole 35 of cup 1. While it probably will be possible to remove cup 1 and spring 2, properly inserting the new cup 1 and spring 2 may be impossible. To overcome this problem, a preferred embodiment of the tool according to the present invention also has a means C for providing fluid communication between hole 35 of cup 1 and the ambient. As will be evident, however, the fluid communication means may be eliminated when the tool is not to be used while water is present in or flowing through hole 35 of cup 1.

Means C for providing fluid communication between hole 35 of cup 1 and the ambient is best shown in FIG. 6. Vent channel 28 extends from tapered primary end 10 of inner member 9 to a point further within inner member 9, and provides fluid communication between primary end 10 and an orifice 29 in outer housing 11. Orifice 29 provides communication with the ambient, and is of sufficient size to ensure that vent channel 28 will remain in alignment, and thus in fluid communication with, orifice 29 throughout the reciprocation range of inner member 9. In this fashion, when the tool is used in its intended manner, fluid communication will exist between hole 35 of cup 1 and the ambient throughout the entire removal and insertion process.

As further shown in FIG. 6, vent channel 28 comprises an axial bore 30 extending from primary end 10 through a portion of inner member 9, and a notch 31 cut into inner member 9, said notch providing fluid communication between axial bore 30 and orifice 29 in outer housing 11. The length of notch 31 is such that fluid communication between axial bore 30 and orifice 29, and thus fluid communication between hole 35 and the ambient, is maintained throughout the entire reciprocation range of inner member 9.

FIG. 7 shows an alternative preferred embodiment for the vent channel of the inner member. Once again a vent channel 78 extends from tapered primary end 60 of inner member 59 to a point further within inner member 59, and thereby provides fluid communication between primary end 60 and orifice 29 of outer housing 11. Vent channel 78 comprises an axial bore 90 extending from primary end 60 through a portion of inner member 59, and a notch 91 cut into inner member 59, notch 91 proving fluid communication between axial bore 90 and orifice 29 of outer housing 11. In this embodiment, however, support member 92 is provided in inner member 59 in the area of notch 91. Support member 92 adds rigidity to inner member 59, and insures that inner member 59 is not overly weakened by the provision of notch 91. When inner member 59 is formed from plastic, for example, the provision of support member 92 is relatively easy, as it can be molded as an integral part of inner member 59. It should also be noted that notch 91 in FIG. 7 is located somewhat closer to tapered end 60, thereby necessitating a similar change for the orifice of the outer housing (as shown in FIG. 9). This ensures that any escaping fluid will exit the tool nearer to the fixture.

When the tool of FIG. 6 or FIG. 7 is used in a fixture in which fluid is present in or flowing through, it will be evident that cup 1 and spring 3 may readily be removed or inserted. In either the removal or insertion process described previously, fluid will flow through hole 35 of cup 1 into axial bore 30. If the fluid is actually flowing through the fixture, the fluid will further pass through axial bore 30, into notch 31, and out orifice 29 into the surroundings. Since fluid communication between hole 35 and the ambient is maintained throughout both the removal and insertion process, pressure imparted by the fluid is relieved, and cup 1 and spring 3 can either be easily removed from or firmly seated in opening 5 of the plumbing fixture.

Various alternatives to the fluid communication means C shown in FIGS. 6 and 7 are possible. For example, vent channel 28 could comprise a single or multiple grooves extending from primary end 10 along the surface of inner member 9, and in fluid with one or more fluid outlets in outer housing 11. Additionally, while orifice 29 is shown in FIG. 6 as being between first end 14 of outer housing 11 and longitudinal slot 17, orifice 29 could be placed anywhere in outer housing 11 provided that vent channel 28 was appropriately sized. The location for orifice 69 shown in FIG. 9 is preferred, however, since this will permit fluid to be vented to the ambient near the plumbing fixture itself, thereby providing a cleaner operation. As a further alternative, vent channel 28 could even be placed in fluid communication with longitudinal slot 17, and therefore the ambient, by merely extending the distance vent channel 28 extends into inner member 9.

An additional advantage of the embodiment of the present invention described in FIGS. 2 through 6 is that outer housing 11, inner member 9, cap assembly 24, and grips 15 and 16 may all be constructed of inexpensive molded plastic. Other materials could certainly be utilized, however. Additionally, various lengths and diameters of outer housing 11 and inner member 9 may be employed, depending on the configuration of the plumbing fixture. If plastic is used to construct the above elements, as is preferred, inner member 9 and grips 15 and 16 can also be molded as a single unit, thereby completely eliminating a manufacturing step.

What is claimed is:

1. A tool for remotely removing and inserting a plumbing fixture seal structure having a hole therethrough, comprising:

(a) an outer housing having first and second ends, said first end having an outer width greater than the inner diameter of said hole;

(b) an inner member, having primary and secondary ends, said primary end tapering from a width greater than the inner diameter of said hole to a width less than the inner diameter of said hole, said inner member being reciprocably disposed at least partially within said outer housing so that upon reciprocation said primary end will extend beyond said first end of said outer housing; and (c) means for retracting at least part of said primary end of said inner member into said outer housing, wherein said retracting means comprises a grip carried by said inner member.

2. The tool of claim 1 wherein said inner member is spring biased to a position wherein said primary end extends at least partially beyond said first end of said outer housing.

3. The tool of claim 1 wherein said outer housing has a longitudinal slot through which said grip protrudes, said longitudinal slot having upper and lower ends so that movement of said grip is limited by said upper and lower ends of said longitudinal slot, thereby limiting the reciprocation of said inner member within said outer housing.

4. The tool of claim 1 wherein said inner member has a groove located adjacent said tapered primary end.

5. The tool of claim 4 wherein said inner member has a plurality of length-wise slits extending from said tapered primary end through said groove.

6. The tool of claim 1 wherein said outer housing has a longitudinal slot through which said grip protrudes, said longitudinal slot having a lower end, and a cap assembly firmly affixed to said second end of said outer housing, said cap having a lower edge, such that movement of said grip is limited by said lower end of said longitudinal slot and by said lower edge of said cap assembly.

7. The tool of claim 2 further comprising a cap assembly having an internal end, said cap assembly firmly affixed to said second end of said outer housing, and a compression spring disposed between said internal end and said secondary end of said inner member.

8. The tool of claim 3 wherein said outer housing has a lengthwise slit extending across the entire width of said outer housing from said upper end of said longitudinal slot to said second end of said outer housing, thereby permitting the width of said second end and the width of said lengthwise slit to be expanded so that said inner member and said grip carried by said inner member can be inserted into said outer housing.

9. A tool for remotely removing and inserting a plumbing fixture seal structure having a hole therethrough, comprising:

(a) an outer housing having first and second ends, said first end having an outer width greater than the inner diameter of said hole;

(b) an inner member, having primary and secondary ends, said primary end tapering from a width greater than the inner diameter of said hole to a width less than the inner diameter of said hole, said inner member being slidably disposed at least partially within said outer housing so that said inner member is axially slidable to a position wherein said primary end will extend beyond said first end of said outer housing, said inner member also having a groove adjacent said tapered primary end, said groove positioned between said tapered primary end and said secondary end, said groove further having a width which is smaller than the greatest width of said tapered primary end; and (c) means for slidably retracting at least part of said primary end of said inner member into said outer housing.

10. The tool of claim 9 wherein said inner member has a plurality of length-wise slits extending through said groove and along a portion of the length of said tapered primary end.

11. A tool for remotely removing and inserting a plumbing fixture seal structure having a hole therethrough, comprising:

(a) an outer housing having first and second ends, said first end having a width greater than the inner diameter of said hole;

(b) an inner member, having primary and secondary ends, said primary end tapering from a width greater than the inner diameter of said hole to a width less than the inner diameter of said hole, said inner member being reciprocably disposed at least partially within said outer housing so that upon reciprocation said primary end will extend at least partially beyond said first end of said outer housing;

(c) means for retracting at least part of said primary end of said inner member into said outer housing; and (d) means for providing fluid communication between said hole and the ambient.

12. The tool of claim 11 wherein said fluid communication means comprises a vent channel passing from said primary end of said inner member at least partially through said inner member.

13. The tool of claim 12 wherein said outer housing has an orifice alignable with said vent channel.

14. The tool of claim 13 wherein said orifice remains in alignment with said vent channel upon retraction of at least part of said inner member into said outer housing.

15. The tool of claim 14 wherein said retracting means comprises a grip carried by said inner member.

16. The tool of claim 12 wherein said inner member is spring biased to a position wherein said primary end extends at least partially beyond said first end of said outer housing.

17. The tool of claim 14 wherein said vent channel comprises an axial bore extending from said primary end of said inner member to a point at least partially within said inner member, and a notch communicating with both said axial bore and the orifice of said outer housing.

18. The tool of claim 16 wherein said outer housing has a longitudinal slot through which said grip protrudes, said longitudinal slot having upper and lower ends so that movement of said grip is limited by said upper and lower ends of said longitudinal slot, thereby limiting the reciprocation of said inner member within said outer housing.

19. The tool of claim 18 further comprising a cap assembly having an internal end, said cap assembly firmly affixed to said second end of said outer housing, and a compression spring disposed between said internal end and said secondary end of said inner member.

20. The tool of claim 19 wherein said outer housing has a lengthwise slit extending across the entire width of said outer housing from said upper end of said longitudinal slot to said second end of said outer housing, thereby permitting the width of said second end and the width of said lengthwise slit to be expanded so that said inner member and said grip carried by said inner member can be inserted into said outer housing.

* * * * *